No. 716,366. Patented Dec. 23, 1902.
M. BAYNO.
ELECTRICAL COOKING APPARATUS.
(Application filed Feb. 19, 1902.)
(No Model.) 2 Sheets—Sheet 1.

Witnesses
Edward Rowlands
Henry Storch

Inventor
Maurice Bayno.
By his Attorney Maurice Block

No. 716,366. Patented Dec. 23, 1902.
M. BAYNO.
ELECTRICAL COOKING APPARATUS.
(Application filed Feb. 19, 1902.)
(No Model.) 2 Sheets—Sheet 2.
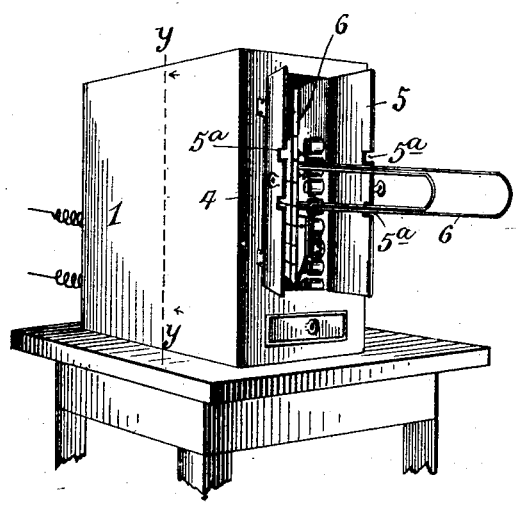
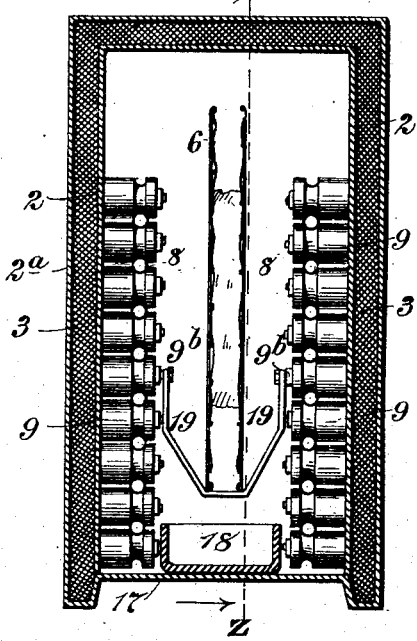
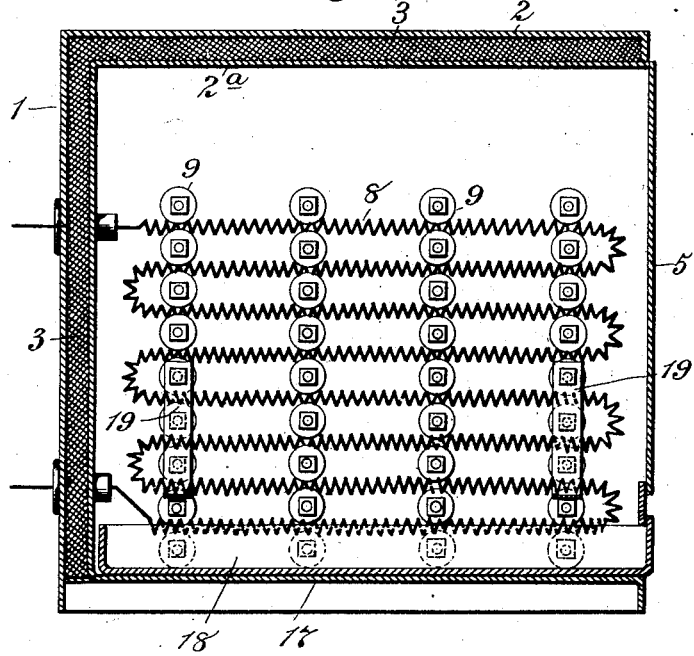
Witnesses
Edward Rowland
Henry Storck
Inventor
Maurice Bayno
By his Attorney
Maurice Bloch

UNITED STATES PATENT OFFICE.

MAURICE BAYNO, OF CEDARHURST, NEW YORK.

ELECTRICAL COOKING APPARATUS.

SPECIFICATION forming part of Letters Patent No. 716,366, dated December 23, 1902.

Application filed February 19, 1902. Serial No. 94,731. (No model.)

*To all whom it may concern:*

Be it known that I, MAURICE BAYNO, a citizen of the United States, residing at Cedarhurst, Queens county, in the State of New York, have invented certain new and useful Improvements in Electrical Cooking Apparatus, of which the following is a specification.

My invention relates to electrical cooking apparatus, more particularly to that class of cooking devices adapted for broiling or baking; and the invention has for its object to provide a simple and practical cooking apparatus wherein the cooking or broiling will take place with a minimum amount of current and with rapidity and effectiveness.

To these and other ends the invention consists in the novel details of improvement and combination and arrangement of parts hereinafter described and claimed.

Reference is to be had to the accompanying drawings, forming part hereof, wherein—

Figure 1:
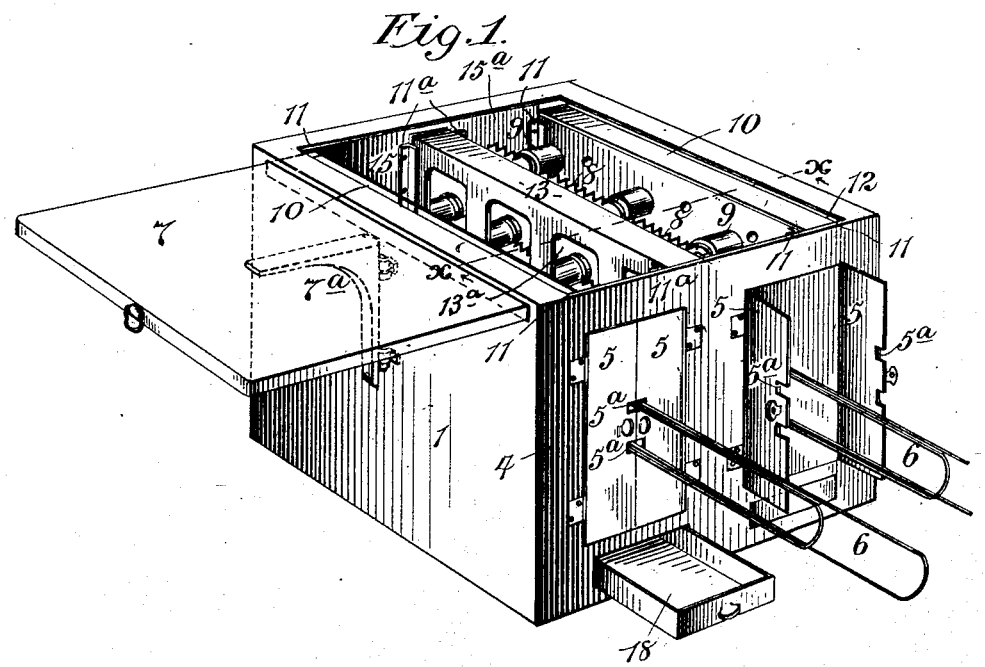
Figure 2:
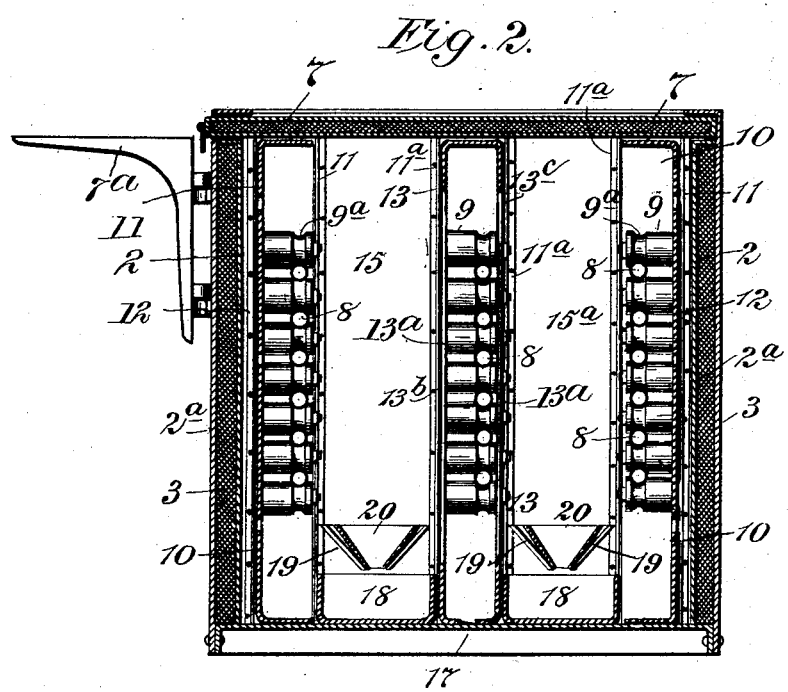

Figure 1 is a perspective view of my improved cooking apparatus. Fig. 2 is a section thereof, taken on the line $x\,x$ of Fig. 1. Fig. 3 is a perspective view of a modified form of my invention. Fig. 4 is a vertical central section of the same, taken on the line $y\,y$ of Fig. 3; and Fig. 5 is a section of Fig. 4, taken on the line $z\,z$ looking in the direction of the arrows, showing in side elevation the arrangement of the heating-coils and insulating-posts.

Like numerals of reference indicate similar parts in the several figures.

Referring to the accompanying drawings, in Figs. 1 and 2 I have shown one form of my invention adapted for broiling and the like and which I term a "duplex broiler-box," although it will be understood that with slight variation the same may be utilized for cooking purposes other than broiling. This duplex broiler-box is shown in the form of a casing 1, which may have its side walls made of two sheets of metal 2 2$^a$, forming a space between them, within which is located fireproof material 3, (as asbestos,) and the front wall 4 of the casing is provided with openings having doors 5, through which broiler-irons 6 may be passed. These doors are provided with notches 5$^a$, adapted to close over the handles of the broiler-irons. The casing is or may be provided with a removable or sliding top or cover 7, Figs. 1 and 2, which may be extended outwardly and rest upon a swinging bracket or other support 7$^a$, located at the side of the casing, as shown, Fig. 1, thus providing a shelf.

Within the casing and between the side walls thereof are located electric heating coils or wires 8, maintained in position by means of horizontally-disposed insulating posts or blocks 9, and by preference these heating-wires are carried in suitable lines around the insulating-posts, (see Fig. 5,) the said posts being provided with grooves 9$^a$, which in Fig. 2 are shown so located as to provide spaces to receive the wires 8, and for the purpose of regulating the amount of heat produced said wires may be arranged in two independent circuits, and suitable switches may be independently connected with these circuits to enable the current to traverse either of the circuits separately or both together, similar to that shown in my companion application.

10 indicates a support within the casing and at each side thereof, preferably foraminous, as a perforated plate, and carrying the insulating-posts 9, around which the wires 8 pass. The supports 10 are preferably independent of the casing and removable therefrom, and for this purpose I have shown the front and rear walls of the casing provided with guideways, or grooves may be provided by angle-pieces 11, attached to the end walls, whereby the supports 10 can be lifted out and are maintained in a vertical position, a space 12 being preferably provided between the supports 10 and the side walls of the casing for the passage or circulation of heat. The supports 10 are shown located near opposite sides of the casing, forming an intermediate space or chamber, and in said space I provide a support 13, having posts 9 and wires 8, similar to those above described, the support 13 being shown in the form of two parallel sections 13$^b$ 13$^c$, provided with openings 13$^a$, Fig. 1, for the passage of heat. This support 13 divides the casing into two compartments 15 15$^a$, Figs. 1 and 2, in which several broilers 6 can be utilized at the same time, from which it will be seen that when the heating-wires connected with the central support 13 and either one of the side supports are heated at the same time the heat will be applied to the article being broiled simultaneously on both sides of the latter, and when all three of the heating appliances are being used the article carried by two broilers can each be heated on opposite sides simultaneously. It will be evident that the casing may be made of such size that the same may be divided into a plurality of compartments 15 15ª for the simultaneous broiling or cooking of numerous articles of food. The support 13 is preferably made removable from the casing in manner similar to that described with respect to the supports 10, as by being supported in grooves or the like of the angle-pieces 11ª, Fig. 1. The casing has a bottom plate 17, upon which the supports 10 and 13 may rest, Fig. 2, and beneath the compartments 15 15ª are trays or drip-pans 18. Above the drip-pans are supports 19, upon which the broilers 6 may rest, and in Fig. 2 I have shown pans 20, provided with openings in their bottoms, carried by the supports 19 and in which the broilers may stand. It will be understood, of course, that when the device is used for broiling the sliding cover 7 is closed over the top of the casing; but for some purposes the same may be removed or extended outwardly to the position shown in Fig. 1, so that the heat emanating from the compartments 15 15ª may be utilized for cooking articles placed upon the open top of the casing.

In Figs. 3 and 4 I have shown another form of broiler-box embodying my invention, which is constructed of a double sheet-metal casing 1, having fireproof material 3 between the sheets 2 2ª, and at one end is an opening provided with a door or closure 5, shown provided with notches 5ª, adapted to close over the handle of a broiler-iron or the like 6, Fig. 3. Within this broiler-box are two sets or series of insulating-posts 9, located on opposite sides, providing a space between them for the broiler-irons, and heating-coils 8 are supported by said posts 9 (see Fig. 4) in manner similar to the coils and posts hereinbefore described. A suitable switch may be provided to control the passage of current through the coils 8. Between the opposing series of insulating-posts 9 is a support 19 for the gridiron 6, Fig. 4, shown in the form of metal straps, one near each end of the box and shown carried upon the posts 9ᵇ. Beneath the gridiron-supports 19 is a drip-pan 18, which may be passed through the front wall of the casing, Figs. 3 and 4.

Having described my invention, what I claim, and desire to secure by Letters Patent, is—

1. In an electric cooking apparatus, a casing, insulating-posts supported on each side of the casing in horizontal planes, electrical coils supported by said posts, and hangers supported between the sides of the casing and adapted to receive a broiling-iron, as and for the purpose described.

2. In an electrical cooking apparatus, a casing, insulating-posts supported on each side of the casing in horizontal planes, securing-bolts for the posts, electrical coils supported by said posts, hangers supported by the posts' securing-bolts and a broiling-iron slidable on the hangers as and for the purpose described.

3. In an electrical cooking apparatus, a casing, angle-pieces secured to the wall near each side and near the center, supports comprising plates having their edges bent out to form a pan-like inclosure, the edges of said plate engaging the angle-pieces, posts secured to the supports, conductor-wires supported by the posts, a central support, posts and conductors on the support and hangers and pans in the spaces between the posts, as and for the purpose described.

4. In an electrical cooking apparatus, a casing containing suitable guides, supports comprising plates having their edges bent at an angle, posts and conductors carried thereby, a central support comprising a plate bent with two sides parallel and with inturned edges, posts and a wire carried thereby and suitable hangers in the spaces between the supports, as and for the purpose described.

MAURICE BAYNO.

Witnesses:
MORRIS WALZER,
HENRY STORCK.